United States Patent
Theriault

(10) Patent No.: US 8,662,896 B2
(45) Date of Patent: Mar. 4, 2014

(54) SET OF ATHLETIC BALLS FOR LEARNING THROUGH GAME PLAY

(76) Inventor: Patricia A. Theriault, Eden Prairie, MN (US)

(*) Notice: Subject to any disclaimer, the term of this patent is extended or adjusted under 35 U.S.C. 154(b) by 274 days.

(21) Appl. No.: 13/111,614

(22) Filed: May 19, 2011

(65) Prior Publication Data
US 2012/0295235 A1    Nov. 22, 2012

(51) Int. Cl.
*G09B 19/00* (2006.01)
(52) U.S. Cl.
USPC ............................................ 434/156
(58) Field of Classification Search
USPC ......... 434/156, 157, 159, 160, 167, 170, 171, 434/172, 174; 273/299, 302; D21/498, 499
See application file for complete search history.

(56) References Cited

U.S. PATENT DOCUMENTS

| | | | | |
|---|---|---|---|---|
| 1,485,146 A | * | 2/1924 | Mundell | 273/296 |
| 1,486,690 A | * | 3/1924 | Scheliga | 434/172 |
| 1,566,730 A | * | 12/1925 | Butler | 273/115 |
| 2,218,375 A | * | 10/1940 | Axelrod | 434/172 |
| 2,459,321 A | * | 1/1949 | Johnson | 434/159 |
| 3,117,384 A | * | 1/1964 | Billis | 434/208 |
| 3,946,195 A | | 3/1976 | Lyons et al. | |
| 4,867,450 A | | 9/1989 | Katz | |
| 5,673,914 A | * | 10/1997 | Sullivan | 273/144 R |
| 5,803,743 A | * | 9/1998 | Kaufman | 434/159 |
| 5,878,659 A | * | 3/1999 | Hatter | 101/35 |
| 5,980,263 A | * | 11/1999 | Conover | 434/322 |
| 6,062,944 A | * | 5/2000 | Hsu | 434/208 |
| 6,761,642 B2 | * | 7/2004 | Ye | 473/1 |

OTHER PUBLICATIONS

Lakeshorelearning.corn, "Alphabet. Activity Balls", Apr. 27, 2011.*
Etsy.com, "Tennis Ball Initials Alphabet 1 Inch Circle Image Collage for Bottle Caps . . . ", Apr. 27, 2011, 5 pgs.
Lakeshorelearning.com, "Alphabet Activity Balls", Apr. 27, 2011, 1 pg.
BuckaBall.com, "Alphabet Bean Bag Set", Apr. 27, 2011, 2 pgs.
Sparklebox.co.uk, "Alphabet and Sounds", Phonemes on sports balls, Apr. 27, 2011, 6 pgs.
Etsy.com, "Needle Felted Alphabet Balls", Apr. 27, 2011, 5 pgs.
Moonatnoon.com, "Puzzle Reference pp. A=1, B=2 . . . Z=26", assembled by Quincunx © 2002-2005, Apr. 29, 2011, 2 pgs.
Rumkin.com, "Letter Numbers", Apr. 29, 2011, 1 pg.
EnchantedLearning.com, "Simple Alphabet Codes to Solve", Apr. 29, 2011, 9 pgs.

* cited by examiner

*Primary Examiner* — Kurt Fernstrom
(74) *Attorney, Agent, or Firm* — Brooks, Cameron & Huebsch, PLLC

(57) ABSTRACT

The present disclosure provides methods for making and sets of athletic balls for use in learning through game play. One or more embodiments include marking each of a number of tennis balls with a different letter symbol of an alphabetical set belonging to a language used in the game play, wherein all the letter symbols of the alphabetical set are used in marking the number of tennis balls; and marking each of the number of tennis balls with a different numerical symbol, the numerical symbol corresponding to a numerical position of the letter symbol in the alphabetical set of the language used in the game play.

17 Claims, 3 Drawing Sheets

SET OF ATHLETIC BALLS FOR LEARNING THROUGH GAME PLAY

TECHNICAL FIELD

The present disclosure relates to a set of athletic balls for use in learning through game play and methods for making the same.

BACKGROUND

Structured educational opportunities (e.g., for children, adults, and elderly adults) can exist in several ways. Opportunities can exist in academic classes in school (e.g., mathematics, language, and/or history). Opportunities can also exist inside and outside of school in the form of physical education classes and/or programs. In some cases, the physical education classes and/or programs emphasize physical activities to a greater extent than academic subjects, such as mathematics and/or language.

Many of these physical education classes and/or programs involve physically active games that naturally draw an individual's attention and as a result, some individuals enjoy these physically active games more than the academic programs, such as mathematics and language. This can sometimes result in a situation where an individual becomes more focused on the physical activities and consequently, their involvement with academic programs drops. As such, challenges arise in finding ways to spark the interest of these individuals in academic subjects.

DETAILED DESCRIPTION

The present disclosure provides a set of athletic balls for use in learning through game play and methods of making the same. One or more embodiments include marking each of a number of tennis balls with a different letter symbol of an alphabetical set belonging to a language used in the game play, wherein all the letter symbols of the alphabetical set are used in marking the number of tennis balls; and marking each of the number of tennis balls with a different numerical symbol, the numerical symbol corresponding to a numerical position of the letter symbol in the alphabetical set of the language used in the game play.

Embodiments of the present disclosure can help children, adults, and/or elderly adults, for example, develop tennis, mathematics, language, reading, and/or thinking skills by combining an athletic ball (e.g., a tennis ball) that can be used in physical activities that incorporate academic subjects (e.g., language and mathematics). As an example, embodiments can provide a tennis ball that combines letter symbols of an alphabetical set and numerical symbols corresponding to the letter symbols for use in physically active games that have academic aspects. Although tennis balls are discussed herein, examples are not so limited and any type of athletic balls (e.g., football, soccer ball, volleyball, etc.) can be used for learning through game play.

In the following detailed description of the present disclosure, reference is made to the accompanying drawings that form a part hereof, and in which is shown by way of illustration how one or more embodiments of the disclosure may be practiced.

These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

As used herein, "a" or "a number of" something can refer to one or more such things. For example, "a number of balls" can refer to one or more balls.

Figure 1:
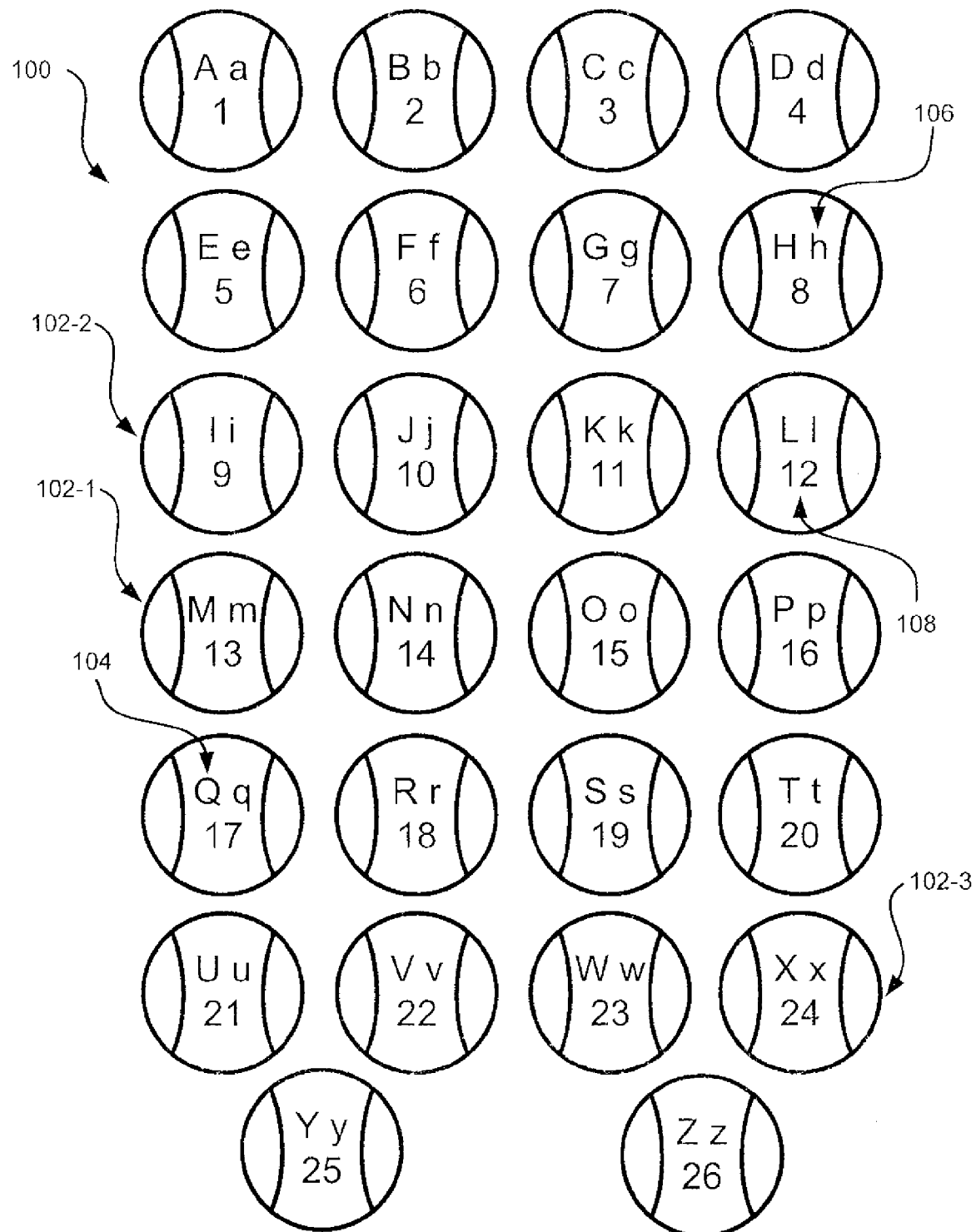
FIG. 1 illustrates an example of a set of tennis balls for use in learning through game play according to one or more embodiments of the present disclosure.

FIG. 1 illustrates an example of a set of tennis balls 100 for use in learning through game play according to one or more embodiments of the present disclosure. The set includes a number of tennis balls 102-1, 102-2, 102-3 referred to generally herein as tennis balls 102, as indicated by the circular shapes shown with letter symbols and numerical symbols. The number of tennis balls 102 can be the same as a number of letter symbols in an alphabetical set used in the game play, although examples are not so limited.

As an example, if a language used in the game play is English, the number of tennis balls 102 can be the same as the number of letter symbols in the English alphabet (i.e., 26). Although FIG. 1 illustrates the number of balls 102 with letter symbols of the English alphabet, examples are not so limited and the alphabet of any language and/or variations thereof can be used (e.g., the Spanish alphabet). Accordingly, the number of tennis balls 102 may increase or decrease as a result of what language is used for the game play.

In one or more embodiments of the present disclosure, the set of tennis balls 100 can include a letter symbol (e.g., 104, 106) on each of the number of tennis balls 102 indicating a letter symbol in the alphabetical set of the language used in the game play, wherein the letter symbol on each tennis ball is of a different letter, such that the entire alphabetical set is represented on the set of balls 100. In an example, the tennis balls 102 can include an upper letter-case of a letter symbol 104. Alternatively, and/or in addition, the tennis balls 102 can include a lower letter-case of a letter symbol 106. As used herein, letter symbol can mean a sign that represents a letter in an alphabet of any language (e.g., English, Spanish, German).

In one or more embodiments, the set of tennis balls 100 can include a different numerical symbol 108 on each of the number of tennis balls 102 indicating a number that corresponds to a numerical position of the letter symbol indicated by the letter symbol (e.g., 104, 106) in the alphabetical set of the language used in the game play. As an example, the numerical position of the letter symbol A can be 1, B can be 2, . . . , and Z can be 26, although examples are not so limited. As a further example, tennis ball 102-1 includes a letter symbol M and a numerical symbol 13, which corresponds to the numerical position of the letter symbol M in the English alphabet. As used herein, numerical symbol can mean a sign that represents a number in a numeral system of any culture (e.g., English, Indian, Greek).

As used herein, game play can mean any number of educational games that use athletic balls and make use of corresponding letter symbols and/or numerical symbols located thereon, which help develop tennis, mathematics, language, reading, and/or thinking skills, although examples are not so limited. Athletic balls can include, but are not limited to footballs, soccer balls, tennis balls, and volleyballs.

In an example, an educational game that uses athletic balls and makes use of corresponding letter symbols and numerical symbols can include having 2 players (e.g., player A and player B) face each other on opposite sides of a tennis court. Player A selects a tennis ball out of the set of tennis balls for use in learning through game play and hits the tennis ball with a racquet to player B. As player A starts to hit the tennis ball, player A must say a word that starts with the letter represented by the letter symbol on the tennis ball. Player B then returns the ball and as player B returns the ball back to player A, player B must say a different word that starts with the letter on the tennis ball. Alternatively, and/or in addition, player A must say a number represented by a numerical symbol on the ball and must also say what the number is after subtracting 1 as player A hits the ball. Player B then returns the ball and must subtract 1 again and say what the number is as player B returns the ball back to player A (e.g., counting backwards). As can be understood, any suitable subject can be taught through use of such balls and multiple subjects (e.g., language and mathematics can be taught at once in various embodiments).

Figure 2:
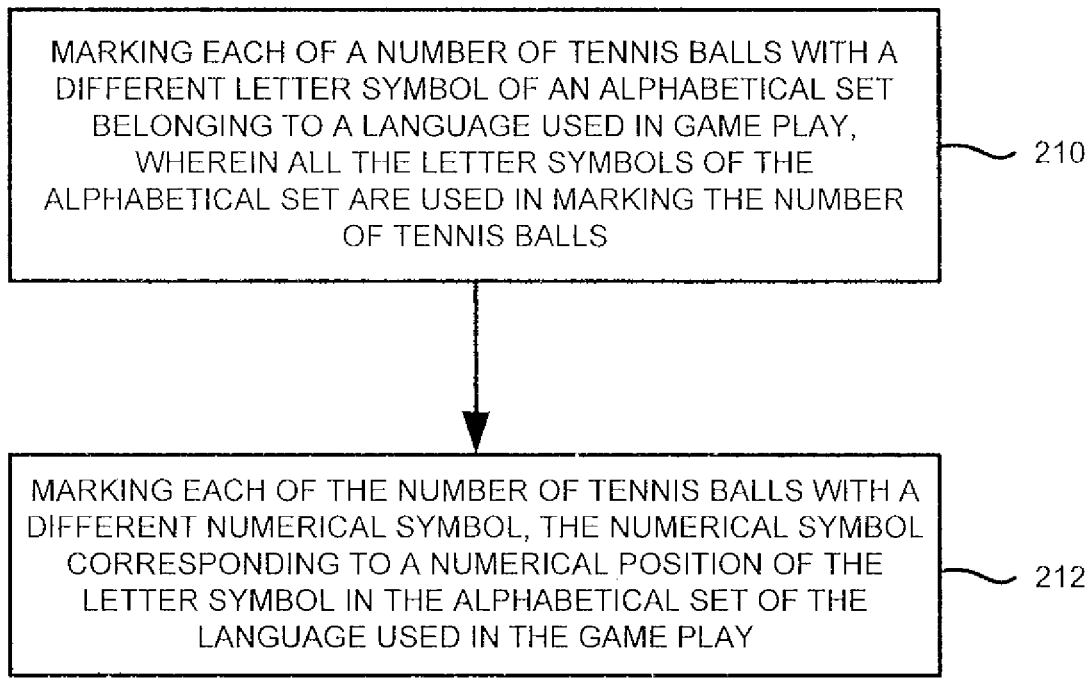
FIG. 2 illustrates an example of a method for making a set of tennis balls for use in learning through game play.

FIG. 2 illustrates an example of a method for making a set of tennis balls for use in learning through game play. In one or more embodiments, the method can include marking 210 each of a number of tennis balls with a different letter symbol of an alphabetical set belonging to a language used in the game play, wherein all the letter symbols of the alphabetical set are used in marking the number of tennis balls. In one or more embodiments, the method can include marking 212 each of the number of tennis balls with a different numerical symbol, the numerical symbol corresponding to a numerical position of the letter symbol in the alphabetical set of the language used in the game play.

In some embodiments, marking the number of tennis balls with a letter symbol and/or numerical symbol can be performed by heating a portion of the surface of the tennis balls to sear the letter symbol and/or numerical symbol onto the surface of the tennis balls. Searing the portion of the surface of the tennis balls can be accomplished by using a material (e.g., nichrome wire) with a high melting point and/or resistivity, which is fashioned into the shape of a letter symbol and/or numerical symbol. An electric current can be applied to the material, causing it to heat to a temperature sufficient to sear the portion of the surface of the tennis balls and create a marking of a letter symbol and/or numerical symbol. Alternatively, and/or in addition, a laser can be used for searing by directing a laser beam at the portion of the surface of the tennis ball to cause the heating and consequently searing of the letter symbol and/or numerical symbol.

In an example, marking the number of tennis balls with a letter symbol and/or numerical symbol can be performed by applying ink, paint, and/or an adhesive onto the surface of the tennis ball. The ink, paint, and/or adhesive can be applied by the use of, for example, silkscreen printing, stamp, spraying, and/or pen, although examples are not so limited. The same or different colored inks, paints, and/or adhesives can further be used to create markings on the tennis balls. In some embodiments, different colors can be used for marking the numerical symbols on the tennis balls versus the letter symbols on the tennis balls. The use of different colors can be beneficial, for example, to help one in distinguishing a letter symbol from a numerical symbol, among other benefits.

Alternatively, and/or in addition, different colors can be used for marking the upper letter-cases of the letter symbols and lower letter-cases of the letter symbols. The use of different colors can be beneficial, for example, to help one in distinguishing an upper letter-case letter symbol from a lower letter-case symbol.

Any type of tennis ball can be used in the examples herein, including low compression tennis balls. Low compression tennis balls may be suitable for children and or beginners in tennis because they offer a slower ball speed due to the reduced compression. Beginners may also prefer low compression tennis balls because they offer a softer feel than standard higher compression tennis balls.

Figure 3:
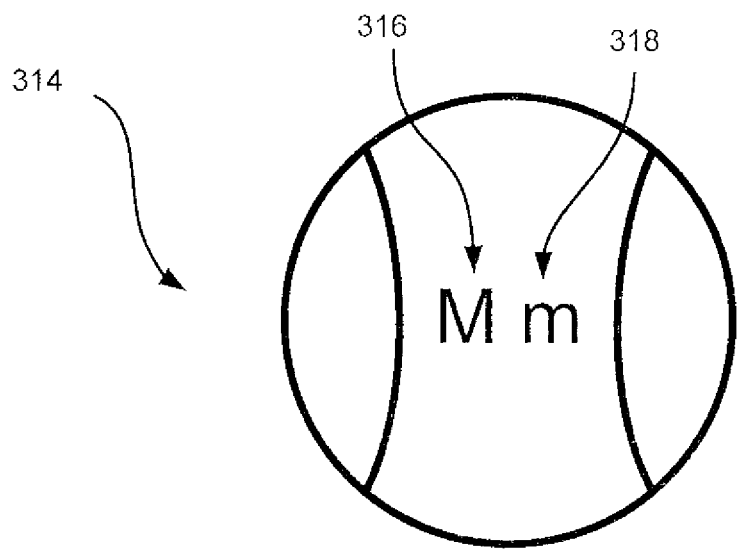
FIG. 3 illustrates an example of a first side of a tennis ball for use in learning through game play.
Figure 4:
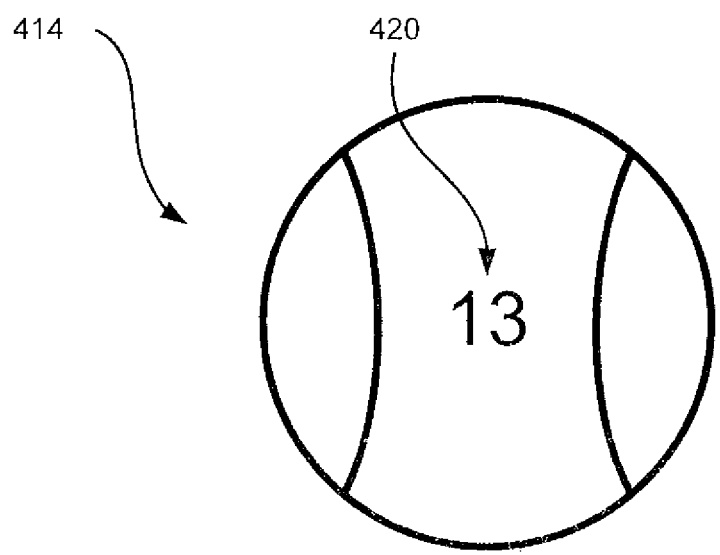
FIG. 4 illustrates a second side of a tennis ball for use in learning through game play.

FIG. 3 illustrates an example of a first side of a tennis ball for use in learning through game play. FIG. 3 shows a hemisphere formed by the first side of a tennis ball 314 with an upper letter-case letter symbol 316 and a lower letter-case letter symbol 318. FIG. 4 illustrates a second side of a tennis ball for use in learning through game play. FIG. 4 shows a hemisphere formed by the second side of tennis ball 414, which is the opposing hemisphere of the first side of tennis ball 314. Also shown in FIG. 4 is a numerical symbol 420. In an example, the letter symbol and/or symbols 316 and 318 and numerical symbol 420 can be located in opposite hemispheres of the tennis ball, as shown in FIGS. 3 and 4. A benefit to this orientation may be that when an individual looks at one side of the tennis ball, they can only see a letter symbol or a numerical symbol, but not both. This may be beneficial, for example, if a game involves an individual stating a corresponding number to a letter or a corresponding letter to a number. Alternatively, and/or in addition, the letter symbol(s) and the numerical symbol can be located in a same hemisphere of the tennis ball, as shown in FIG. 1. A benefit to this may be that when an individual looks at one side of the tennis ball, they can see both the letter symbol and the corresponding numerical symbol. This may be beneficial when a game requires that an individual use a letter symbol and numerical symbol in conjunction with one another.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for making a set of balls for use in learning through game play, the method comprising:
    marking, in a first color, each of a number of balls with a different letter symbol of an alphabetical set belonging to a language used in the game play, wherein all the letter symbols of the alphabetical set are used in marking the number of balls; and
    marking, in a second color, each of the number of balls with a different numerical symbol, the numerical symbol corresponding to a numerical position of the letter symbol in the alphabetical set of the language used in the game play, wherein the first color and the second color are different colors.

2. The method of claim 1, wherein marking the number of balls is performed by heating a portion of the surface of the balls to sear the letter symbol and numerical symbol onto the surface of the balls.

3. The method of claim 1, wherein marking the number of balls is performed by applying ink onto the surface of the ball.

4. The method of claim 1, wherein marking the number of balls is performed by applying an adhesive onto the surface of the balls.

5. The method of claim 1, wherein the balls are low compression balls.

6. The method of claim 1, wherein the letter symbol on each of the balls includes a lower letter-case of the letter symbol.

7. The method of claim 1, wherein the letter symbol on each of the balls includes an upper letter-case of the letter symbol.

8. A set of balls for use in learning through game play, the set comprising:
    a number of balls, wherein the number of balls is the same as a number of letter symbols in an alphabetical set of a language used in the game play;
    a letter symbol, marked in a first color, on each of the number of balls indicating a letter symbol in the alphabetical set of the language used in the game play, wherein the letter symbol on each ball is of a different letter symbol;
    a different numerical symbol, marked in a second color, on each of the number of balls indicating a number that corresponds to a numerical position of the letter symbol indicated by the letter symbol in the alphabetical set of the language used in the game play, wherein the first color and the second color are different colors.

9. The set of balls in claim 8, wherein the letter symbol on each of the balls includes upper and lower letter-cases of the letter symbol.

10. The set of balls in claim 8, wherein the letter symbol and the numerical symbol are printed on the balls.

11. The set of balls in claim 8, wherein the number of balls is 26 and the language includes English.

12. The set of balls in claim 8, wherein the language includes Spanish.

13. A set of balls for use in learning through game play, the set comprising:
    a number of balls, wherein the number of balls is 26;
    a letter symbol, in a first color, on each of the 26 balls indicating a letter symbol in the English alphabet, wherein the letter symbol on each ball is of a different letter symbol;
    a different numerical symbol, in a second color, on each of the number of balls indicating a number that corresponds to a numerical position of the letter symbol indicated by the letter symbol in the English alphabet, wherein the first color and the second color are different colors.

14. The set of balls in claim 13, wherein the numerical position of letter symbol A is 1 and letter symbol Z is 26.

15. The set of balls in claim 13, wherein the letter symbol is the same color as the numerical symbol.

16. The set of balls in claim 13, wherein the letter symbol and the numerical symbol are located in a same hemisphere of each of the number of balls.

17. The set of balls in claim 13, wherein the letter symbol and the numerical symbol are located in opposite hemispheres of each of the number of balls.

* * * * *